United States Patent
Kim et al.

(10) Patent No.: US 10,469,145 B2
(45) Date of Patent: *Nov. 5, 2019

(54) METHOD AND APPARATUS FOR TRANSMITTING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

This patent is subject to a terminal disclaimer.

(21) Appl. No.: 15/819,071

(22) Filed: Nov. 21, 2017

(65) Prior Publication Data

US 2018/0115353 A1 Apr. 26, 2018

Related U.S. Application Data

(63) Continuation of application No. 14/767,241, filed as application No. PCT/KR2014/005001 on Jun. 5, 2014, now Pat. No. 9,912,392.

(Continued)

(51) Int. Cl.
*H04B 7/0456* (2017.01)
*H04B 17/382* (2015.01)
(Continued)

(52) U.S. Cl.
CPC ......... *H04B 7/0486* (2013.01); *H04B 7/0417* (2013.01); *H04B 7/0456* (2013.01);
(Continued)

(58) Field of Classification Search
CPC ................................................... H04B 7/0456
See application file for complete search history.

(56) References Cited

U.S. PATENT DOCUMENTS

| 8,503,384 | B1 | 8/2013 | Cendrillon et al. |
| 8,599,761 | B2 | 12/2013 | Liu et al. |
| | | (Continued) | |

FOREIGN PATENT DOCUMENTS

| CN | 101969367 A | 2/2011 |
| CN | 102368698 A | 3/2012 |
| | (Continued) | |

OTHER PUBLICATIONS

Alcatel-Lucent et al, "Way Forward of 4tx Rank 1 and 2 Codebook Design for Downlink MIMO Enhancement in Rel-12," R1-132738, 3GPP TSG RAN WG1 #73, Fukuoka, Japan, May 20-24, 2013, 9 pages.

(Continued)

*Primary Examiner* — Jamaal Henson
(74) *Attorney, Agent, or Firm* — Birch, Stewart, Kolasch & Birch, LLP

(57) ABSTRACT

A method for reporting channel state information (CSI) by a user equipment (UE) in a wireless communication system, the method includes jointly encoding a rank indicator (RI) and a first precoding matrix indicator (PMI) into an encoded value for a specific CSI report mode; and reporting the encoded value, wherein the RI and the first PMI are jointly encoded into the encoded value in a way that following conditions are satisfied: when the RI is 1 and a codebook index for the first PMI is same as the encoded value, the encoded value is an integer ranging from 0 to 7, when the RI is 2 and the codebook index for the first PMI is the encoded value minus 8, the encoded value is integer ranging from 8

(Continued)

to 15, when the RI is 3 and a first precoding matrix corresponding to the first PMI is an identity matrix.

10 Claims, 13 Drawing Sheets

Related U.S. Application Data

(60) Provisional application No. 61/831,151, filed on Jun. 5, 2013.

(51) Int. Cl.
| | | |
|---|---|---|
| *H04B 7/06* | (2006.01) | |
| *H04B 7/0417* | (2017.01) | |
| *H04L 5/00* | (2006.01) | |
| *H04W 72/04* | (2009.01) | |
| *H04W 72/06* | (2009.01) | |
| *H04L 1/00* | (2006.01) | |
| *H04W 88/02* | (2009.01) | |

(52) U.S. Cl.
CPC ......... *H04B 7/0478* (2013.01); *H04B 7/0639* (2013.01); *H04B 17/382* (2015.01); *H04L 1/0026* (2013.01); *H04L 1/0027* (2013.01); *H04L 5/0023* (2013.01); *H04L 5/0057* (2013.01); *H04W 72/0413* (2013.01); *H04W 72/06* (2013.01); *H04W 88/02* (2013.01)

(56) References Cited

U.S. PATENT DOCUMENTS

| | | | |
|---|---|---|---|
| 2008/0080449 | A1 | 4/2008 | Huang et al. |
| 2008/0232503 | A1 | 9/2008 | Kim |
| 2008/0247475 | A1 | 10/2008 | Kim et al. |
| 2009/0232245 | A1 | 9/2009 | Lakkis |
| 2009/0262854 | A1 | 10/2009 | Lee et al. |
| 2010/0039928 | A1 | 2/2010 | Noh et al. |
| 2010/0041390 | A1 | 2/2010 | Chen et al. |
| 2010/0061482 | A1 | 3/2010 | Lee et al. |
| 2010/0062708 | A1 | 3/2010 | Sangiamwong et al. |
| 2010/0098144 | A1 | 4/2010 | Clerckx et al. |
| 2010/0166094 | A1 | 7/2010 | Lee et al. |
| 2010/0189079 | A1 | 7/2010 | Eichinger et al. |
| 2010/0248729 | A1 | 9/2010 | Yu et al. |
| 2011/0069773 | A1 | 3/2011 | Doron et al. |
| 2011/0085457 | A1 | 4/2011 | Chen et al. |
| 2011/0090985 | A1 | 4/2011 | Zhou et al. |
| 2011/0096755 | A1 | 4/2011 | Clerckx et al. |
| 2011/0128939 | A1 | 6/2011 | Lim et al. |
| 2011/0142144 | A1 | 6/2011 | Allpress et al. |
| 2011/0170489 | A1 | 7/2011 | Han et al. |
| 2011/0235567 | A1 | 9/2011 | Seo et al. |
| 2011/0243026 | A1 | 10/2011 | Kim et al. |
| 2011/0249763 | A1 | 10/2011 | Tosato et al. |
| 2011/0268067 | A1 | 11/2011 | Seo et al. |
| 2011/0268204 | A1 | 11/2011 | Choi et al. |
| 2012/0003945 | A1* | 1/2012 | Liu .............. H04B 7/0639 455/115.1 |
| 2012/0020288 | A1 | 1/2012 | Liu et al. |
| 2012/0025946 | A1 | 2/2012 | Chuang et al. |
| 2012/0039412 | A1 | 2/2012 | Geirhofer et al. |
| 2012/0063494 | A1 | 3/2012 | Frenne et al. |
| 2012/0069917 | A1* | 3/2012 | Liu .............. H04B 7/0623 375/259 |
| 2012/0076023 | A1 | 3/2012 | Ko et al. |
| 2012/0083280 | A1 | 4/2012 | Liu et al. |
| 2012/0093090 | A1 | 4/2012 | Han et al. |
| 2012/0099545 | A1 | 4/2012 | Han et al. |
| 2012/0127869 | A1 | 5/2012 | Yin et al. |
| 2012/0128084 | A1 | 5/2012 | Aguirre et al. |
| 2012/0201282 | A1 | 8/2012 | Li et al. |
| 2012/0218948 | A1* | 8/2012 | Onggosanusi ........ H04L 1/0031 370/329 |
| 2012/0300724 | A1 | 11/2012 | Liu et al. |
| 2012/0314590 | A1 | 12/2012 | Choudhury et al. |
| 2013/0058295 | A1 | 3/2013 | Ko et al. |
| 2013/0058424 | A1 | 3/2013 | Enescu et al. |
| 2013/0064273 | A1 | 3/2013 | Tosato |
| 2013/0064276 | A1 | 3/2013 | Kim et al. |
| 2013/0070723 | A1 | 3/2013 | Yie et al. |
| 2013/0077660 | A1 | 3/2013 | Ko et al. |
| 2013/0083743 | A1 | 4/2013 | Koo et al. |
| 2013/0088978 | A1 | 4/2013 | Mondal et al. |
| 2013/0089165 | A1 | 4/2013 | Chen et al. |
| 2013/0114655 | A1 | 5/2013 | Gomadam |
| 2013/0114656 | A1 | 5/2013 | Sayana et al. |
| 2013/0114763 | A1 | 5/2013 | Park |
| 2013/0188593 | A1 | 7/2013 | Chen et al. |
| 2013/0202057 | A1 | 8/2013 | Chen et al. |
| 2013/0315284 | A1 | 11/2013 | Nammi |
| 2013/0343220 | A1 | 12/2013 | Chun et al. |
| 2014/0328422 | A1* | 11/2014 | Chen .............. H04B 7/0486 375/267 |
| 2014/0369436 | A1 | 12/2014 | Zhang et al. |

FOREIGN PATENT DOCUMENTS

| | | |
|---|---|---|
| CN | 102468929 A | 5/2012 |
| CN | 103039014 A | 4/2013 |
| CN | 103098383 A | 5/2013 |
| CN | 103119859 A | 5/2013 |
| EP | 2560298 A2 | 2/2013 |
| JP | 2016-517192 A | 6/2016 |
| KR | 10-2011-0111250 A | 10/2011 |
| KR | 10-2011-0114482 A | 10/2011 |
| RU | 2 419 891 C2 | 5/2011 |
| RU | 2424616 C2 | 7/2011 |
| RU | 2438251 C2 | 12/2011 |
| WO | WO 03/102021 A1 | 12/2003 |
| WO | WO 2011/082832 A1 | 7/2011 |
| WO | WO 2012/039588 A2 | 3/2012 |
| WO | WO 2012/041103 A1 | 4/2012 |
| WO | WO 2012/064249 A1 | 5/2012 |
| WO | WO 2013/050191 A1 | 4/2013 |
| WO | WO 2013/067819 A1 | 5/2013 |
| WO | WO 2014/131031 A1 | 8/2014 |

OTHER PUBLICATIONS

LG Electronics, "Proposal on 4tx Codebook for DL MIMO Enhancement," R1-131809, 3GPP TSG RAN WG1 Meeting #72bis, Chicago, USA, Apr. 15-19, 2013, 2 pages.
NEC Group, "Remaining Issues of Enhanced 4TX Codebook," R1-132835, 3GPP TSG RAN WG1 Meeting #73, Fukuoka, Japan, May 20-24, 2013, pp. 1-7.
Nokia Siemens Networks et al, "Evaluation of 4Tx codebooks 2a and 2b," R1-132846, 3GPP TSG-RAN WG1 Meeting #73, Fukuoka, Japan, May 20-24, 2013, 6 pages.
Huawei et al., "Down-sampling C1 and/or C2 for PUCCH Mode 1-1 in Rel.10," 3GPP TSG RAN WG1#62bis, R1-105249, Xi'an, China, Oct. 11-15, 2010, 6 pages.
Motorola, "4 Tx Codebook Design based on Two-Component Framework," 3GPP TSG RAN1 #62, R1-104698, Madrid, Spain, Aug. 23-27, 2010, pp. 1-14.
ZTE, "Evaluation Results of 4Tx Codebook Proposals," 3GPP TSG RAN WG1 Meeting #72bis, R1-131067, Chicago, USA, Apr. 15-19, 2013, 8 pages.
ZTE, "Further Design Refinement and Performance Evaluation of 2-Level codebook for 4Tx LTE-A DL MIMO," 3GPP TSG RAN WG1 Meeting #62, R1-104557, Madrid, Spain, Aug. 23-27, 2010, 9 pages.
3GPP, "3rd Generation Partnership Project; Technical Specification Group Radio Access Network; Evolved Universal Terrestrial Radio Access (E-UTRA); Physical layer procedures (Release 10)," 3GPP TS 36.213 V10.5.0, Mar. 2012, pp. 1-125.
Nokia et al., "Detailed PUCCH CSI feedback signaling design," 3GPP TSG-RAN WG1 Meeting #62bis, R1-105533, Xi'an, China, Oct. 11-15, 2010, 10 pages.

(56) References Cited

OTHER PUBLICATIONS

Panasonic, "Double Codebook PUCCH Reporting in Rel-10," 3GPP TSG RAN WG1 Meeting #62bis, R1-105492, Xi'an, China, Oct. 11-15, 2010, pp. 1-3.

Alcatel-Lucent Shanghai Bell et al., "Proposals of enhanced 4Tx codebook and codebook subsampling," 3GPP TSG RAN WG1 Meeting #73, R1-132840, Fukuoka, Japan, May 20-24, 2013, pp. 1-6.

\* cited by examiner

FIG. 2
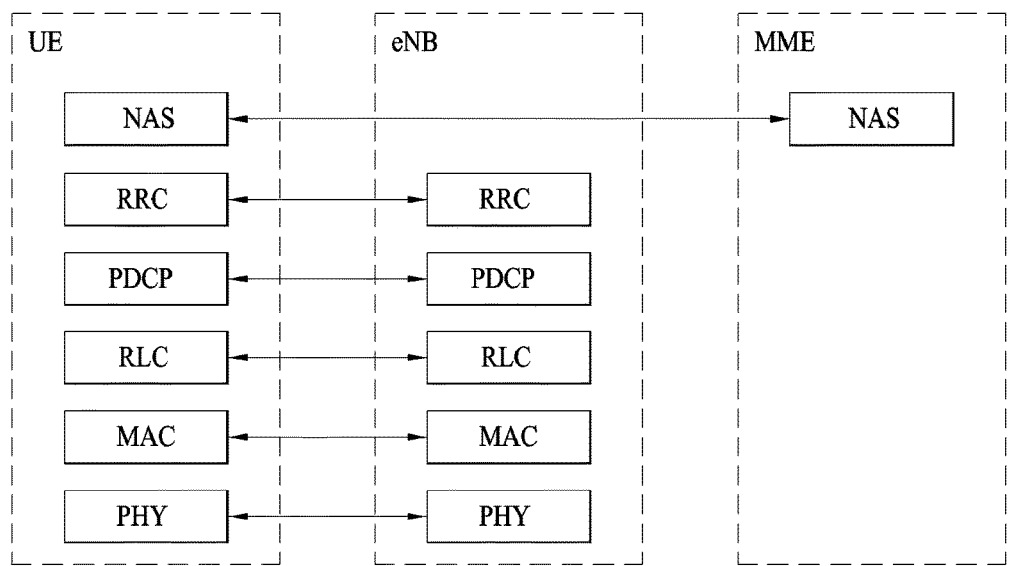
(a) CONTROL-PLANE PROTOCOL STACK
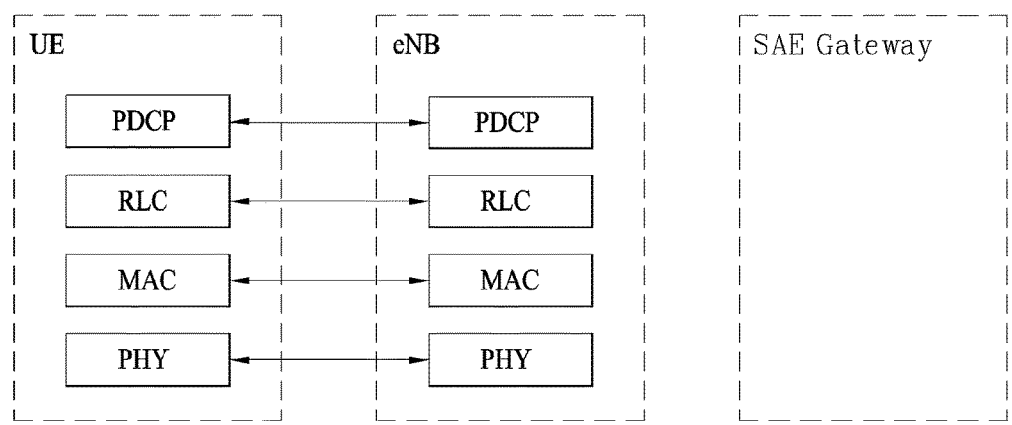
(b) USER-PLANE PROTOCOL STACK

| CQI REPORTING MODE | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE-SELECTED (SUBBAND CQI) | MODE 2-0 | MODE 2-1 |

FIG. 12
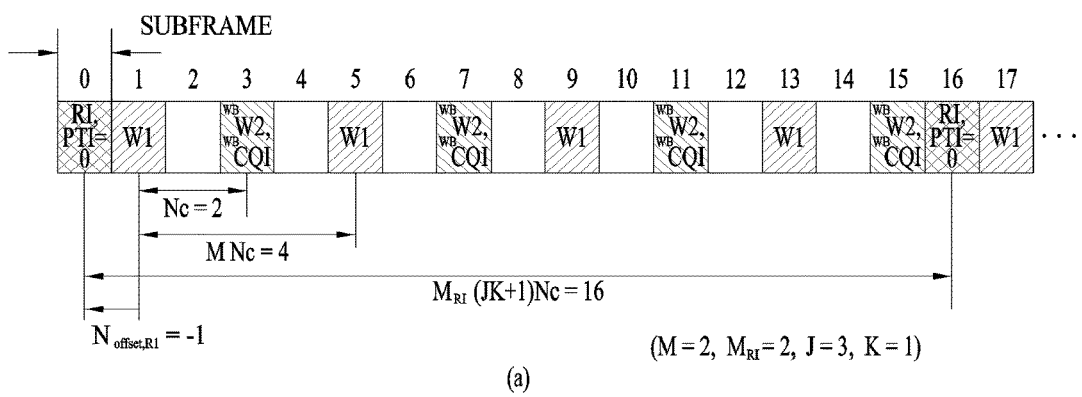
(a)
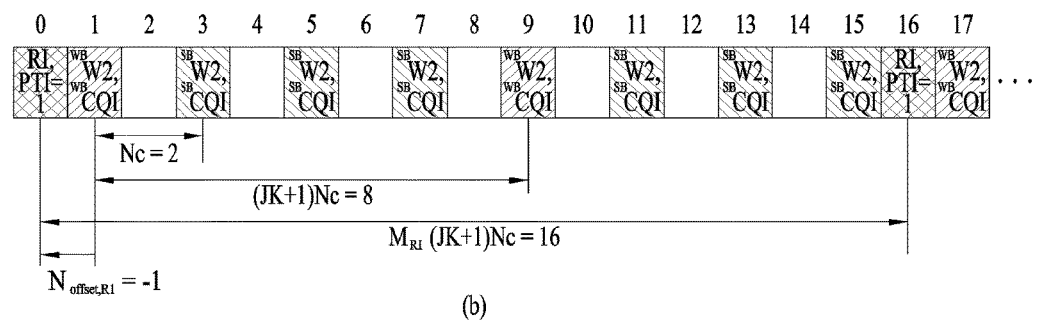
(b)
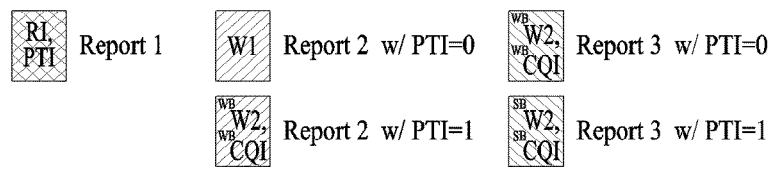

FIG. 13
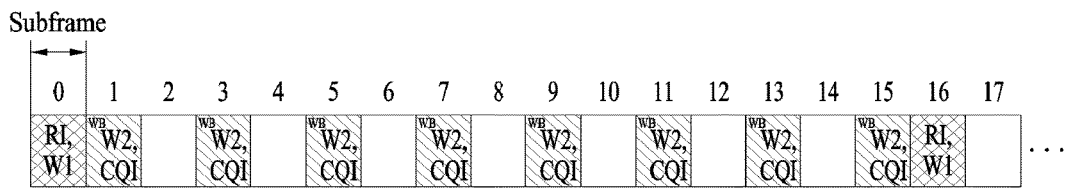
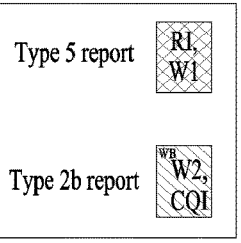
FIG. 14
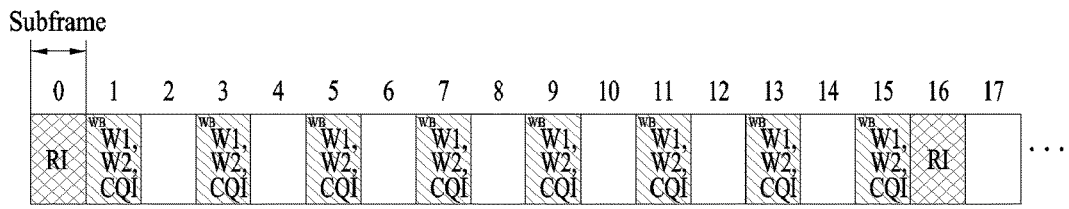
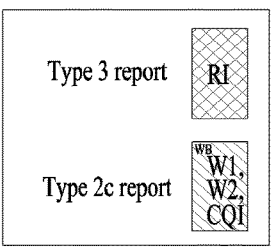

FIG. 15
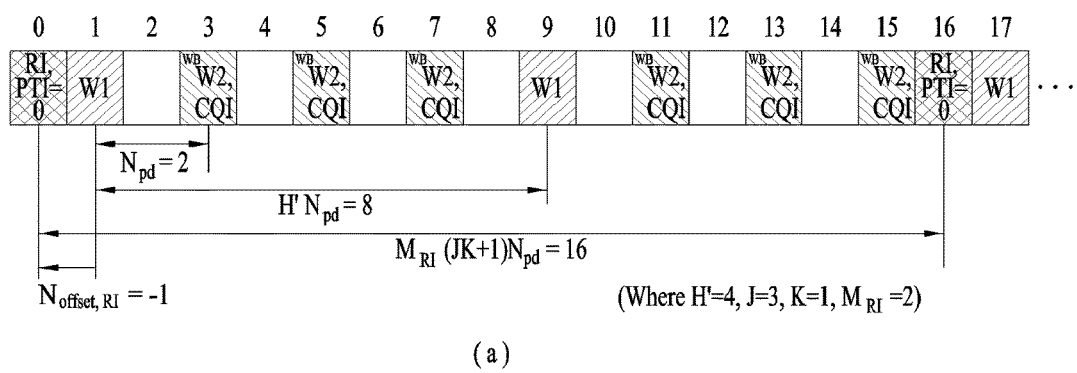
(a)
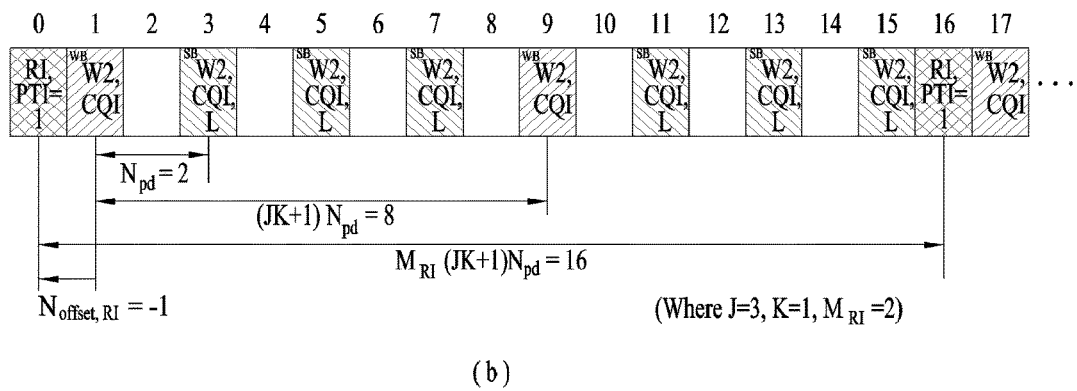
(b)

METHOD AND APPARATUS FOR TRANSMITTING CHANNEL STATE INFORMATION IN WIRELESS COMMUNICATION SYSTEM

CROSS-REFERENCE TO RELATED APPLICATIONS

This Application is a Continuation of U.S. patent application Ser. No. 14/767,241 filed on Aug. 11, 2015 (now U.S. Pat. No. 9,912,392 issued Mar. 6, 2018), which is the National Phase of PCT International Application No. PCT/KR2014/005001 filed on Jun. 5, 2014, which claims the benefit under 35 U.S.C. § 119(e) to U.S. Provisional Application No. 61/831,151 filed on Jun. 5, 2013, all of which are hereby expressly incorporated by reference into the present application.

BACKGROUND OF THE INVENTION

Field of the Invention

The present invention relates to a wireless communication system, and more particularly, to a method and apparatus for transmitting channel state information using joint-encoding in a wireless communication system.

Discussion of the Related Art

A 3rd generation partnership project long term evolution (3GPP LTE) communication system will be described below as an exemplary mobile communication system to which the present invention is applicable.

FIG. 1 is a diagram schematically showing a network structure of an evolved universal mobile telecommunications system (E-UMTS) as an exemplary radio communication system. The E-UMTS system has evolved from the conventional UMTS system and basic standardization thereof is currently underway in the 3GPP. The E-UMTS may be generally referred to as a long term evolution (LTE) system. For details of the technical specifications of the UMTS and E-UMTS, refer to Release 7 and Release 8 of "3rd generation partnership project; technical specification group radio access network".

Referring to FIG. 1, the E-UMTS includes a user equipment (UE), eNBs (or eNode Bs or base stations), and an access gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A core network (CN) may include the AG, a network node for user registration of the UE, and the like. The AG manages mobility of a UE on a tracking area (TA) basis, wherein one TA includes a plurality of cells.

Although radio communication technology has been developed up to LTE based on wideband code division multiple access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

Multiple-input multiple-output (MIMO) technology refers to a method for enhancing transmission and receiving data efficiency by employing multiple transmit antennas and multiple receive antennas instead of one transmit antenna and one receive antenna. That is, the MIMO technology enhances capacity or improves performance using multiple antennas in a transmitting end or a receiving end of a wireless communication system. The MIMO technology may also be referred to as multiple antenna technology.

In order to support multiple antenna transmission, a precoding matrix for appropriately distributing transmitted information according to a channel situation and so on can be applied to each antenna.

SUMMARY OF THE INVENTION

An object of the present invention devised to solve the problem lies in a method and apparatus for transmitting channel state information in a wireless communication system.

It is to be understood that both the foregoing general description and the following detailed description of the present invention are exemplary and explanatory and are intended to provide further explanation of the invention as claimed.

The object of the present invention can be achieved by providing a method for transmitting channel state information (CSI) by a user equipment in a wireless communication system, the method including joint-encoding a rank indicator (RI) and a first precoding matrix indicator (PMI) to one encoding value in a report mode for a 4 antenna port, and transmitting the channel state information including the encoding value, wherein, when the RI is 1, a codebook index has the same value as the encoding value, and when the RI is 2, the codebook index has a value smaller than the encoding value by 8.

In another aspect of the present invention, provided herein is a user equipment for transmitting channel state information (CSI) in a wireless communication system, the user equipment including a radio frequency (RF) unit, and a processor, wherein the processor is configured to joint-encode a rank indicator (RI) and a first precoding matrix indicator (PMI) to one encoding value in a report mode for a 4 antenna port and to transmit the channel state information including the encoding value, when the RI is 1, a codebook index has the same value as the encoding value, and when the RI is 2, the codebook index has a value smaller than the encoding value by 8.

The following features may be commonly applied to the above embodiments of the present invention.

When the RI is 1, the encoding value may have one of integers from 0 to 7.

When the RI is 2, the encoding value may have one of integers from 8 to 15.

When the RI is 3, the encoding value may have 16.
When the RI is 4, the encoding value may have 17.

The first PMI may correspond to wideband and long-term PMI and may be used to determine a final PMI together with subband and short-term second PMI.

The report mode may be a first submode of physical uplink control channel (PUCCH) mode 1-1 for reporting PMI and wideband channel quality indicator (CQI).

It is to be understood that both the foregoing general description and the following detailed description of the present invention are exemplary and explanatory and are intended to provide further explanation of the invention as claimed.

According to embodiments of the present invention, a method and apparatus for effectively transmitting channel state information using joint-encoding in a wireless communication system is provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 2 is a diagram illustrating a control plane and a user plane of a radio interface protocol between a UE and an evolved universal terrestrial radio access network (E-UTRAN) based on a 3rd generation partnership project (3GPP) radio access network standard;

FIG. 12 is a diagram illustrating periodic reporting of channel state information discussed in an LTE-A system;

FIG. 13 is a diagram illustrating CSI feedback in submode 1 of mode 1-1 of FIG. 8;

FIG. 14 is a diagram illustrating CSI feedback in submode 2 of mode 1-1 of FIG. 8;

FIG. 15 is a diagram illustrating CSI feedback in mode 2-1 of FIG. 8;

DETAILED DESCRIPTION OF THE EMBODIMENTS

Figure 1:
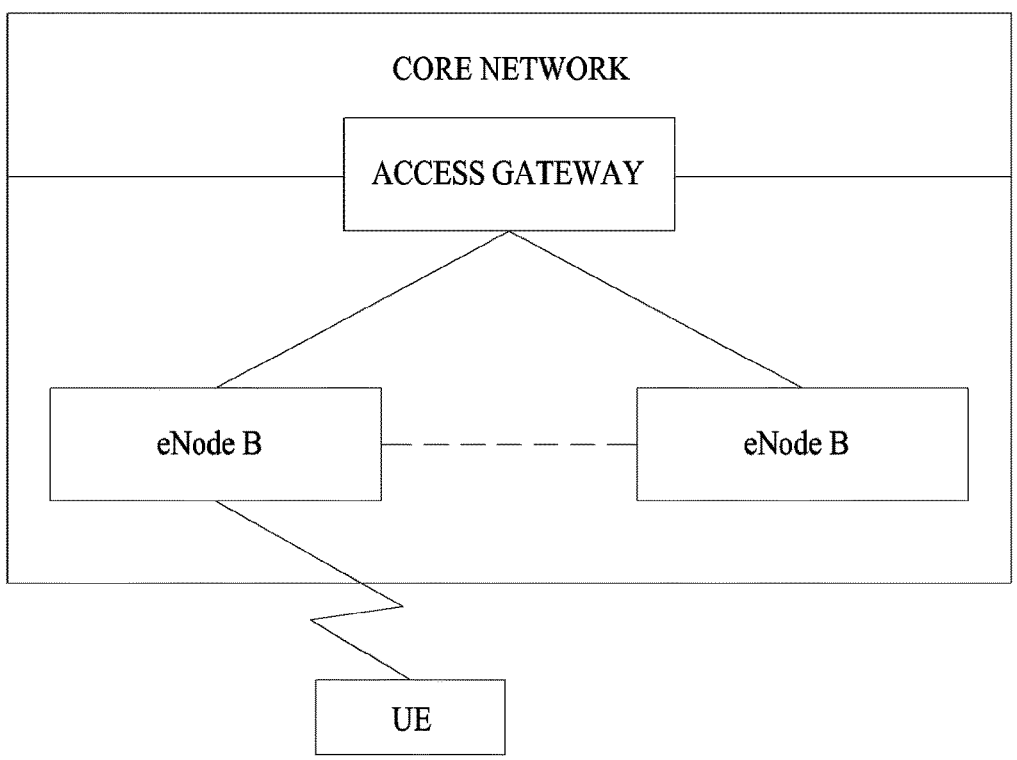
FIG. 1 is a diagram schematically showing a network structure of an evolved universal mobile telecommunications system (E-UMTS) as an exemplary radio communication system.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
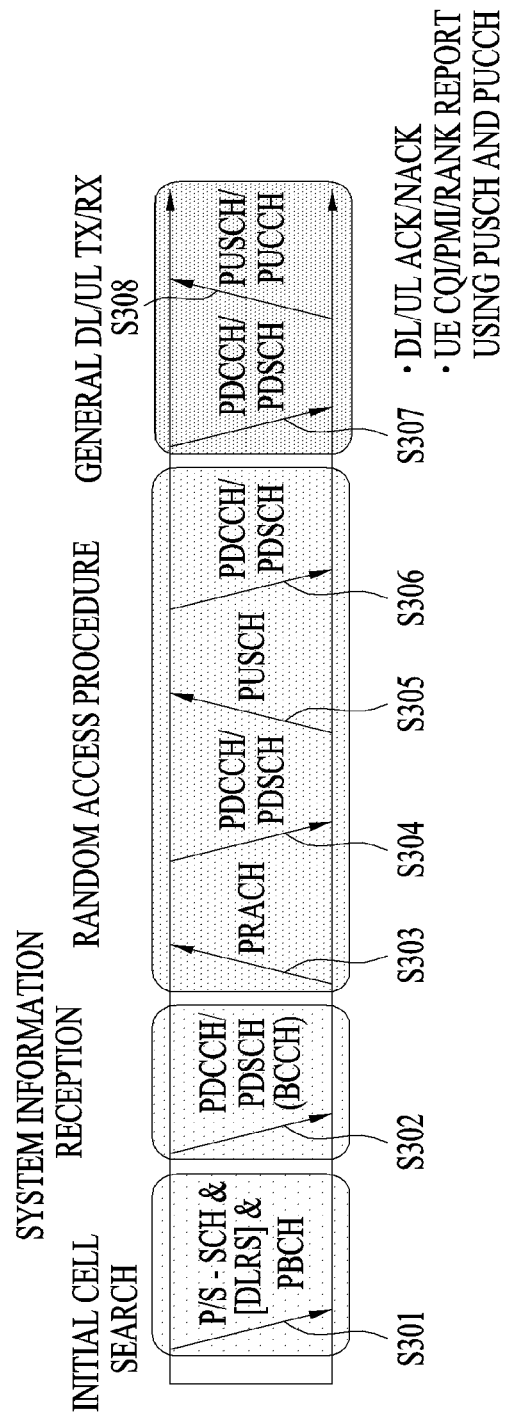
FIG. 3 is a diagram showing physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
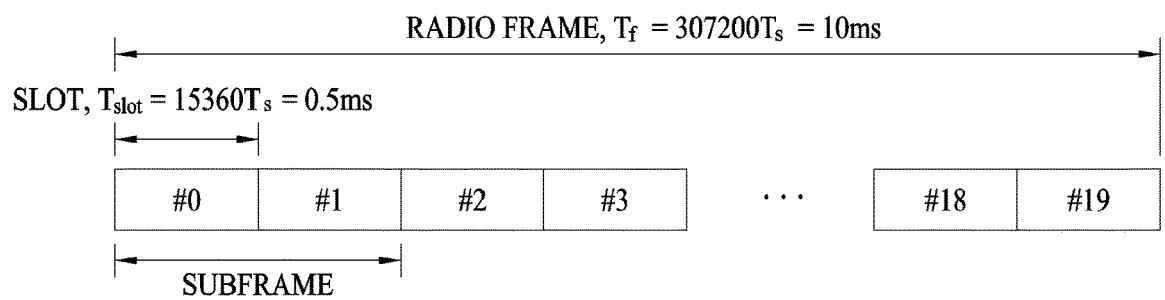
FIG. 4 is a diagram illustrating an example of the structure of a radio frame used in a long term evolution (LTE) system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by $Ts=1/(15 kHz \times 2048)=3.2552 \times 10-8$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
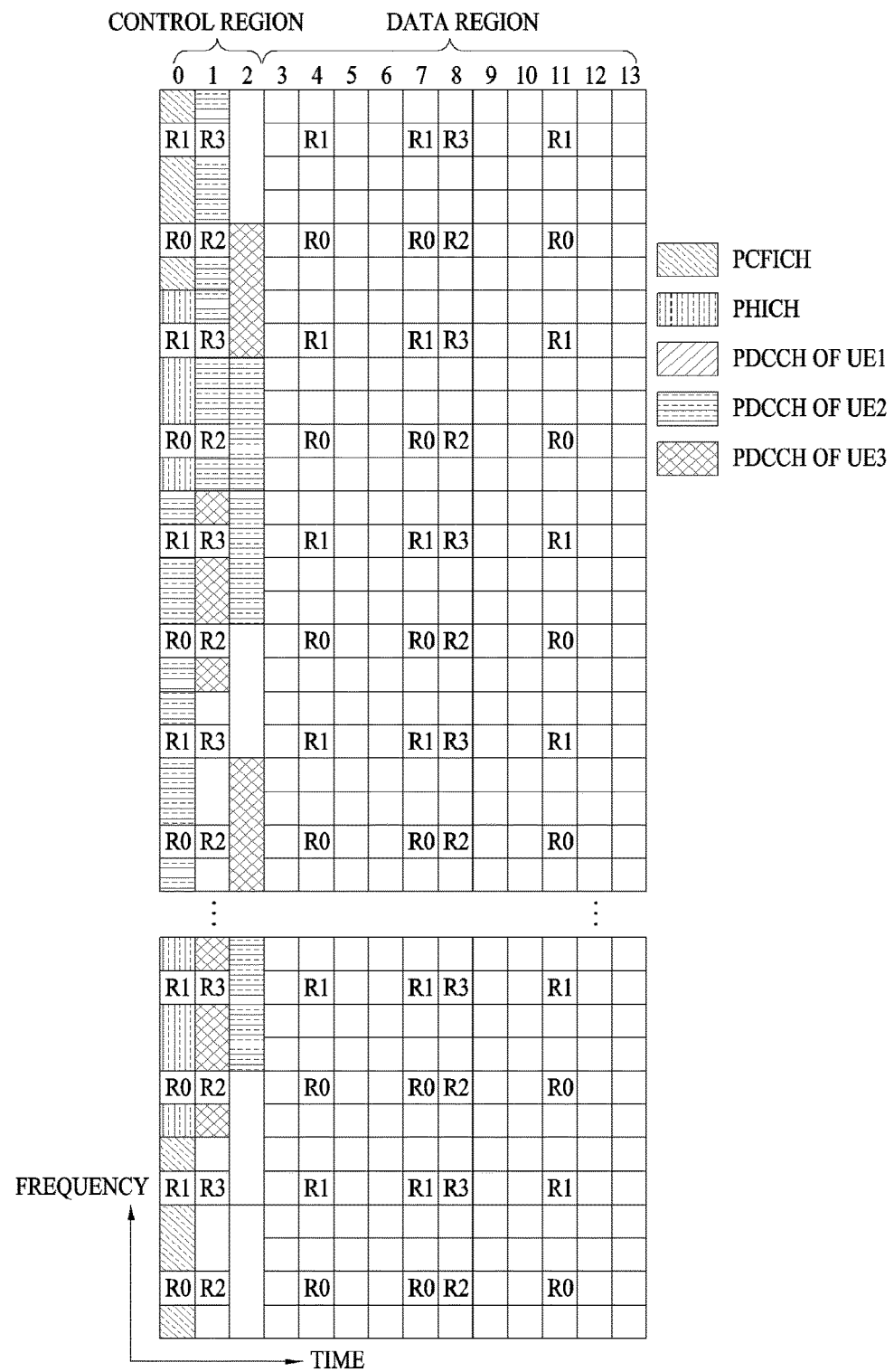
FIG. 5 is a diagram illustrating a control channel included in a control region of a subframe in a downlink radio frame.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
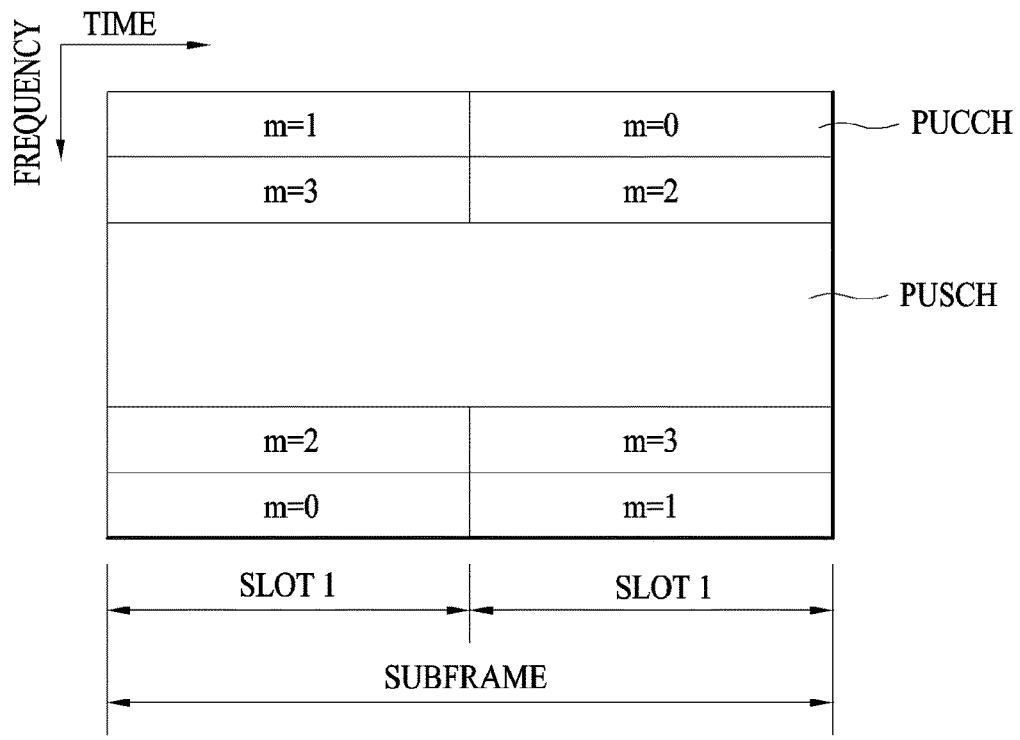
FIG. 6 is a diagram illustrating an uplink subframe structure used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

MIMO System

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
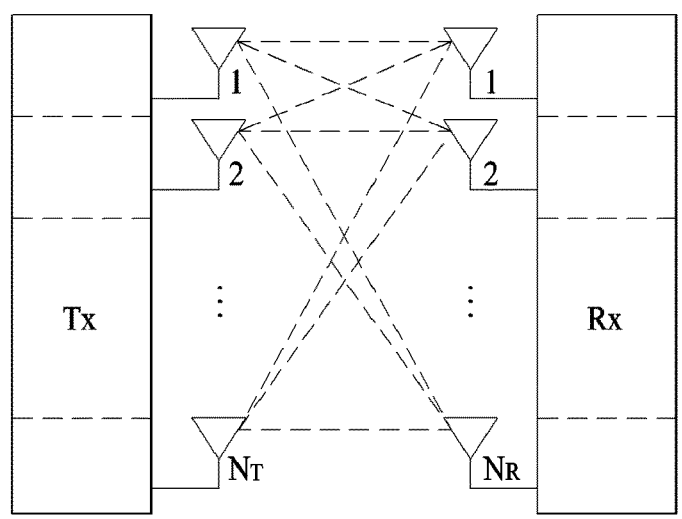
FIG. 7 illustrates the configuration of a typical multiple input multiple output (MIMO) communication system.

The configuration of a general MIMO communication system is shown in FIG. 7. A transmitting end is equipped with NT transmission (Tx) antennas and a receiving end is equipped with NR reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is Ro, a transfer rate using multiple antennas can be theoretically increased by the product of the maximum transfer rate Ro by a rate increment Ri. The rate increment Ri is represented by the following equation 1 where Ri is the smaller of NT and NR.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that NT Tx antennas and NR Rx antennas are present. In the case of a transmission signal, a maximum number of transmittable pieces of information is NT under the condition that NT Tx antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector $\hat{S}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

CSI Feedback

Now, a description of a Channel State Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1 W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{ where } X_i \text{ is } Nt/2 \text{ by } M \text{ matrix} \quad \text{[Equation 9]}$$

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r \text{ columns}} \text{ (if rank = r)},$$

where $1 \leq k, l, m \leq M$ and $k, l, m$ are integer.

where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j, \beta_j,$ and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

As described above, CSI in the LTE system includes, but is not limited to, CQI, PMI, and RI. According to transmission mode of each UE, all or some of the CQI, PMI, and RI is transmitted. Periodic transmission of CSI is referred to as periodic reporting and transmission of CSI at the request of an eNB is referred to as aperiodic reporting. In aperiodic reporting, a request bit included in uplink scheduling information transmitted by the eNB is transmitted to the UE. Then, the UE transmits CSI considering transmission mode thereof to the eNB through an uplink data channel (PUSCH). In periodic reporting, a period of CSI and an offset at the period are signaled in the unit of subframes by a semi-static scheme through a higher-layer signal per UE. The UE transmits CSI considering transmission mode to the eNB through an uplink control channel (PUCCH). If there is uplink data in a subframe in which CSI is transmitted, the CSI is transmitted through an uplink data channel (PUSCH) together with the uplink data. The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

FIGS. 8 to 11 illustrate periodic reporting of CSI in an LTE system.

Figures 8, 9:
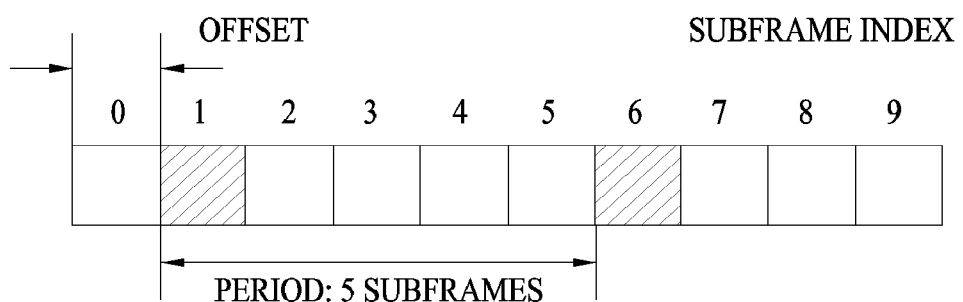
FIGS. 8 to 11 illustrate periodic reporting of channel state information (CSI)

Referring to FIG. 8, there are four CQI reporting modes in the LTE system. Specifically, the CQI reporting modes may be divided into modes in a WideBand (WB) CQI and modes in a SubBand (SB) CQI according to CQI feedback type. The CQI reporting mode may also be divided into modes in a No PMI and modes in a single PMI depending on whether a PMI is transmitted or not. Each UE is informed of information comprised of a period and an offset through RRC signaling in order to periodically report CQI.

FIG. 9 illustrates an example of transmitting CSI when a UE receives information indicating {a period '5' and an offset '1' } through signaling. Referring to FIG. 9, upon receiving the information indicating the period '5' and offset '1', the UE transmits CSI in the unit of 5 subframes with an offset of one subframe in ascending order of a subframe index counted from 0 starting from the first subframe. Although the CSI is transmitted basically through a PUCCH, if a PUSCH for data transmission is present at the same transmission time point, the CSI is transmitted through the PUSCH together with data. The subframe index is given as a combination of a system frame number (or a radio frame index) of and a slot index ns (0 to 19). Since one subframe includes two slots, the subframe index may be defined as 10×nf+floor(ns/2) wherein floor( ) indicates the floor function.

CQI transmission types include a type of transmitting a WB CQI only and a type of transmitting both a WB CQI and an SB CQI. In the type of transmitting a WB CQI only, CQI information for all bands is transmitted in subframes corresponding to every CQI transmission period. Meanwhile, in the case in which PMI information should also be transmitted according to the PMI feedback type as illustrated in FIG. 8, the PMI information is transmitted together with the CQI information. In the type of transmitting both a WB CQI and an SB CQI, the WB CQI and SB CQI are alternately transmitted.

Figure 10:
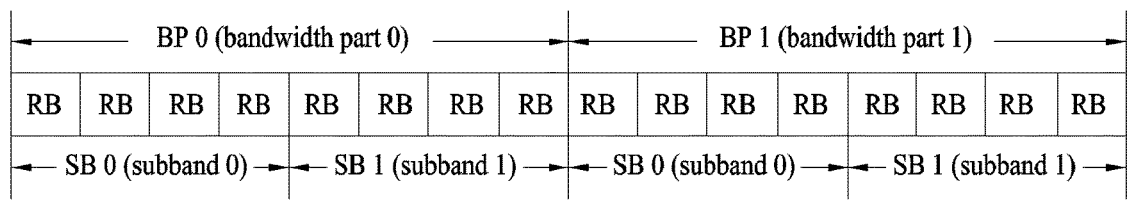
Figure 11:
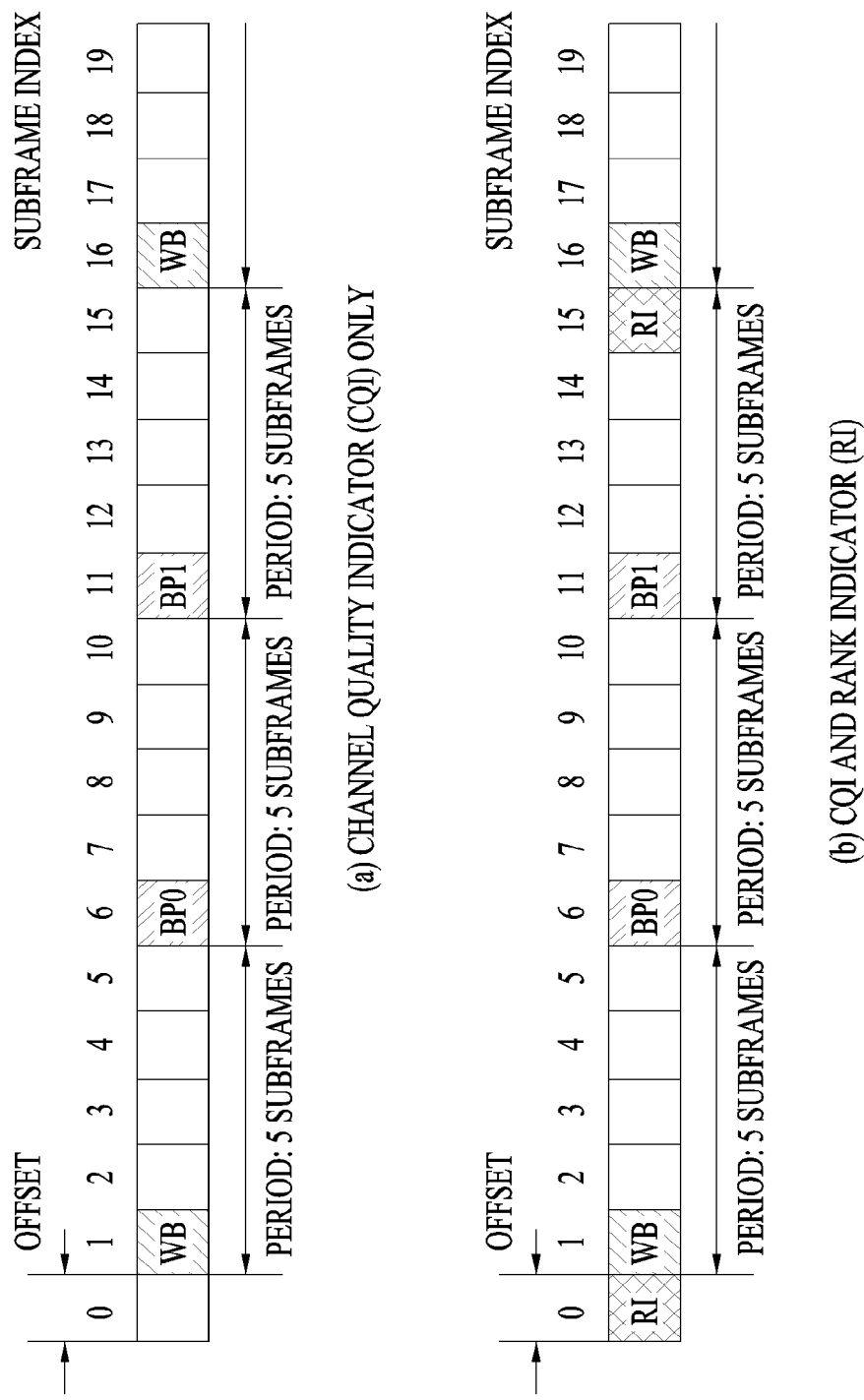

FIG. 10 illustrates a system in which a system bandwidth consists of 16 RBs. It is assumed that the system bandwidth includes two Bandwidth Parts (BPs) BP0 and BP1 each consisting of two SubBands (SBs) SB0 and SB1 and each SB includes 4 RBs. The above assumption is exemplary and the number of BPs and the size of each SB may vary with the size of the system bandwidth. The number of SBs constituting each BP may differ according to the number of RBs, the number of BPs, and the size of each SB.

In the CQI transmission type of transmitting both a WB CQI and an SB CQI, the WB CQI is transmitted in the first CQI transmission subframe and an SB CQI of the better SB state of SB0 and SB1 in BP0 is transmitted in the next CQI transmission subframe together with and an index of the corresponding SB (e.g. Subband Selection Indicator (SSI). Thereafter, an SB CQI of the better SB state of SB0 and SB1 in BP1 and an index of the corresponding SB are transmitted in the next CQI transmission subframe. Thus, CQI of each BP is sequentially transmitted after transmission of the WB CQI. The CQI of each BP may be sequentially transmitted once to four times during the interval between transmission intervals of two WB CQIs. For example, if the CQI of each BP is transmitted once during the time interval between two WB CQIs, CQIs may be transmitted in the order of WB CQI⇒BP0 CQI⇒BP1 CQI⇒WB CQI. If the CQI of each BP is transmitted four times during the time interval between two WB CQIs, CQIs may be transmitted in the order of WB CQI⇒BP0 CQI⇒BP1 CQI⇒BP0 CQI⇒BP1 CQI⇒BP0 CQI⇒BP1 CQI⇒BP0 CQI⇒BP1 CQI⇒WB CQI. Information as to how many times each BP CQI is transmitted is signaled by a higher layer (RRC layer).

FIG. 11(a) illustrates an example of transmitting both a WB CQI and an SB CQI when a UE receives information indicating {period '5' and offset '1'} through signaling.

Referring to FIG. 11(a), a CQI may be transmitted only in subframes corresponding to the signaled period and offset regardless of type.

FIG. 11(b) illustrates an example of transmitting an RI in addition to the example shown in FIG. 11(a). The RI may be signaled as a combination of a multiple of a WB CQI transmission period and an offset at the transmission period from a higher layer (e.g. RRC layer). The offset of the RI is signaled using a value relative to the offset of a CQI. For example, if the offset of the CQI is '1' and the offset of the RI is '0', the RI has the same offset as the CQI. The offset value of the RI is defined as 0 or a negative number. More specifically, it is assumed in FIG. 11(b) that, in an environment identical to that of FIG. 11(a), an RI transmission period is a multiple of 1 of the WB CQI transmission period and the RI offset is '−1'. Since the RS transmission period is a multiple of 1 of the WB CQI transmission period, the RS transmission period and the WB CQI transmission period are substantially the same. Since the offset of the RI is '−1', the RI is transmitted based upon the value '−1' (i.e. subframe index 0) relative to the offset '1' of the CQI in FIG. 11(a). If the offset of the RI is '0', the transmission subframes of the WB CQI and RI overlap. In this case, the WB CQI is dropped and the RI is transmitted.

FIG. 12 is a diagram illustrating periodic reporting of channel state information discussed in an LTE-A system. When an eNB has 8 transmit antennas, in the case of mode 2-1, a precoder type indication (PTI) parameter as a 1-bit indicator may be set, and a periodic reporting mode subdivided into two types may be considered according to the PTI value, as shown in FIG. 12. In the drawing, W1 and W2 indicate a hierarchical codebook described with reference to Equations 8 and 9 above. When both W1 and W2 are determined, W1 and W2 are combined to determine a complete form of precoding matrix W.

Referring to FIG. 12, in the case of periodic reporting, different information items corresponding to Report 1, Report 2, and Report 3 are reported with different repetition periodicities. Report 1 reports RI and a 1-bit PTI value. Report 2 reports wideband (WB) W1 (in the case of PTI=0) or WB W2 and WB CQI (in the case of PTI=1). Report 3 reports WB W2 and WB CQI (in the case of PTI=0) or subband (SB) W2 and SB CQI (in the case of PTI=1).

In Report 2 and Report 3, a subframe index is transmitted in a subframe (for convenience, referred to as a first subframe set) that satisfies (10*nf+floor(ns/2)−N offset, CQI) mod (Nc)=0. N offset, CQI corresponding to an offset value for PMI/CQI transmission illustrated in FIG. 9. In addition, Nc indicates a subframe interval between adjacent Report 2 or Report 3. FIG. 12 illustrates the case of N offset, CQI=1 and Nc=2, and the first subframe set is configured with subframes with an odd index. nf indicates a system frame number (or a radio frame index), and ns indicates a slot index in a radio frame. floor( ) indicates a rounddown function, and A mod B indicates a remainder obtained by dividing A by B.

Report 2 is positioned on some subframes in the first subframe set, and Report 3 is positioned on the remaining subframes. In detail, Report 2 is positioned on a subframe in which a subframe index satisfies (10*nf+floor(ns/2)−N offset, CQI) mod (H*Nc)=0. Accordingly, Report 2 is transmitted every interval of H*Nc, and Report 3 transmission is filled in one or more first subframes between adjacent Report 2. In the case of PTI=0, H=M and M is determined via high layer signaling. FIG. 12 illustrates the case of M=2. When PTI=1, H=J*K+1, K is determined via high layer signaling, and J is the number of bandwidth parts (BPs). FIG. 12 illustrates the case of J=3 and K=1.

Report 1 is transmitted in a subframe in which a subframe index satisfies (10*nf+floor(ns/2)−N offset, CQI−N offset, RI) mod (MRI*(J*K+1)*Nc)=0, and MRI is determined via high layer signaling. N offset, RI indicates a relative offset value for RI, and FIG. 12 illustrates the case of MRI=2 and N offset, RI=−1. According to N offset, RI=−1, transmission time points of Report 1 and Report 2 are not overlapped with each other. When a UE calculates RI, W1, and W2, RI, W1, and W2 are associated and calculated. For example, W1 and W2 are calculated according to RI, and W2 is calculated according to W1. When both Report 2 and Report 3 are reported subsequent to Report 1, an eNB may know final W from W1 and W2.

FIG. 13 is a diagram illustrating CSI feedback in submode 1 of mode 1-1 of FIG. 8.

When PUCCH feedback mode 1-1 uses a dual codebook, submode 1 and submode 2 are present. FIG. 13 illustrates submode 1. Wideband W2 and wideband CQI are set to offset 1 and periodicity 2 and RI and W1 are set to offset 0 and periodicity 16.

In the 8Tx codebook, as shown in Table 1 below, RI and W1 are joint-encoded in 5 bits and in this case, and W1 is subsampled as shown in Table 1 below in order to reduce the sizes of payloads of RI and W1 to report information with a low coding rate. Since RI is referred to by the remaining PMI and CQI, encoding needs to be performed with a low coding rate in order to prevent a decoding error in RI from occurring.

TABLE 1

| hypotheses | RI | values |
| --- | --- | --- |
| 0-7 | 1 | {0, 2, 4, 6, 8, 10, 12, 14} |
| 8-15 | 2 | {0, 2, 4, 6, 8, 10, 12, 14} |
| 16-17 | 3 | {0, 2} |
| 18-19 | 4 | {0, 2} |
| 20-21 | 5 | {0, 2} |
| 22-23 | 6 | {0, 2} |
| 24-25 | 7 | {0, 2} |
| 26 | 8 | {0} |
| 27-31 | reserved | NA |

FIG. 14 is a diagram illustrating CSI feedback in submode 2 of mode 1-1 of FIG. 8.

As described above, when PUCCH feedback mode 1-1 uses a dual codebook structure, submode 1 and submode 2 are present. FIG. 14 illustrates an example of submode 2. Wideband W1/W2 and wideband CQI are set with offset 1 and periodicity 2. RI is set with offset 0 and periodicity 16.

CSI information to an eNB through PUCCH format 2. That is, CSI information may be transmitted in 11 bits as a payload size of PUCCH format 2. Accordingly, a codebook needs to be subsampled such that a payload of type 2c does not exceed a total of 11 bits. To this end, in 8Tx codebook, W1 and W2 are subsampled to report type 2c, as shown in Table 2 below.

TABLE 2

| | PMI for W1 | | PMI for W2 | | total |
| --- | --- | --- | --- | --- | --- |
| RI | #bits | values | #bits | values | #bits |
| 1 | 3 | {0, 2, 4, 6, 8, 10, 12, 14}, | 1 | {0, 2} | 4 |
| 2 | 3 | {0, 2, 4, 6, 8, 10, 12, 14} | 1 | {0, 1} | 4 |
| 3 | 1 | {0, 2} | 3 | {0, 1, 2, 3, 8, 9, 10, 11} | 4 |
| 4 | 1 | {0, 1} | 3 | {0, 1, 2, 3, 4, 5, 6, 7} | 4 |

TABLE 2-continued

| | PMI for W1 | | PMI for W2 | | total |
|---|---|---|---|---|---|
| RI | #bits | values | #bits | values | #bits |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | {0} | 0 | {0} | 0 |

8Tx W1 for rank 1 and 8Tx W1 for rank 2 are the same. In addition, $i^{th}$ PMI and $(i+1)^{th}$ PMI of W1 share two overlapped DFT vectors. As such, two DFT vectors may be overlapped between adjacent PMIs, thereby more accurately feeding back a channel. However, due to a limited PUCCH resource, PMI of even-numbered W1 may be limited to an even number and subsampled as shown in Table 2 above. Overlapped DFT vectors between even-numbered PMIs are not present, but the UE can represent a total of 32 DFT vectors using the subsampled W1, thereby minimizing performance degradation.

FIG. 15 is a diagram illustrating CSI feedback in mode 2-1 of FIG. 8.

When PUCCH feedback mode 2-1 uses a dual codebook structure, two methods are defined according to a PTI value. FIG. 15(a) illustrates the case in which PTI is 0 and FIG. 15(b) illustrates the case in which PTI is 1. Referring to FIG. 15(a), wideband W1 is reported with periodicity of 8 subframes in a PUCCH feedback resource with offset 1 and periodicity 2, and wideband W2 and CQI are reported in the remaining resource. RI and PTI are set with periodicity 16 and offset 0. In FIG. 15(b), when PTI is set to 1, subband W2 and subband CQI and L-bit information indicating a subband index are reported.

In FIG. 15(b), in type 1a report in which subband W2 and subband CQI and L-bit information indicating a subband index are reported together, 8Tx codebook W2 is subsampled as shown in Table 3 below. Information in 11 bits as a payload size of PUCCH format 2 may be transmitted through the subsampling. In Table 2, W2 codeword of rank 2 reports only 0, 2, 4, and 6. These values perform a function for selecting one beam from beam groups constituting W1 to general a final codebook. For example, when W1 is configured according to the following equation, if codeword 0 of W2 is selected, final codebook W is determined as $$W = \begin{bmatrix} w_{11} & w_{11} \\ w_{11} & -w_{11} \end{bmatrix}$$

using only $w_{11}$. In Equation 11 below, $w_{11}$, $w_{12}$, $w_{13}$, and $w_{14}$ indicate a 4×1 column vector.

$$W1 = \begin{bmatrix} [w_{11}w_{12}w_{13}w_{14}] & 0 \\ 0 & [w_{11}w_{12}w_{13}w_{14}] \end{bmatrix}$$ [Equation 11]

Similarly, when codeword 2 of W2 is selected, the final codebook W is determined using only $w_{12}$, when codeword 4 of W2 is selected, the final codebook W is determined using only $w_{13}$, and when codeword 6 of W2 is selected, the final codebook W is determined using only $w_{14}$.

Table 3 below shows codebook subsampling in PUCCH mode 2-1. mod indicates modular operation.

TABLE 3

Relationship between the second PMI value and codebook index $i_2$

| RI | Value of the second PMI $I_{PMI\,2}$ | Codebook index $i_2$ |
|---|---|---|
| 1 | 0-15 | $I_{PMI\,2}$ |
| 2 | 0-3 | $2I_{PMI\,2}$ |
| 3 | 0-3 | $8 \cdot \lfloor I_{PMI\,2}/2 \rfloor + (I_{PMI\,2} \bmod 2) + 2$ |
| 4 | 0-3 | $2I_{PMI\,2}$ |
| 5 | 0 | 0 |
| 6 | 0 | 0 |
| 7 | 0 | 0 |
| 8 | 0 | 0 |

A CSI reporting type may be set to one of various types. For example, a CSI reporting type defined in LTE release-10 will now be described. Type 1 reporting supports CQI feedback for UE selection sub-bands. Type 1a reporting supports subband CQI and second PMI feedback. Type 2, Type 2b, and Type 2c reporting supports wideband CQI and PMI feedback. Type 2a reporting supports wideband PMI feedback. Type 3 reporting supports RI feedback. Type 4 reporting supports wideband CQI. Type 5 reporting supports RI and wideband PMI feedback. Type 6 reporting supports RI and PTI feedback.

4Tx Codebook

4 Tx codebook may be represented by multiplication of two matrices as follows.

$$W = W_1 \cdot W_2$$ [Equation 12]

Here, the inner precoder $W_1$ and the outer precoder $W_2$ may represent wideband/long-term channel properties and subband/short-term channel properties, respectively. $W_1$ may be set as follows.

$$W_1 = \begin{bmatrix} X_n & 0 \\ 0 & X_n \end{bmatrix}, n = 0, 1, \ldots, 15$$ [Equation 13]

Here, $X_n$ may be set as follows.

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32}$$ [Equation 53]

Codebook $W_2$ for rank 1 may be set as follows.

$$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \right.$$ [Equation 14]
$$\left. \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\},$$

$Y = e_1 \in \{e_1, e_2, e_3, e_4\}$ and $\alpha(i) = q_1^{2(i-1)}$

Codebook $W_2$ for rank 2 may be set as follows.

$$W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\},$$ [Equation 15]

-continued $$(Y_1, Y_2) = (e_i, e_k) \in \{(e_1, e_1), (e_2, e_2), (e_3, e_3),$$
$$(e_4, e_4), (e_1, e_2), (e_2, e_3), (e_1, e_4), (e_2, e_4)\}$$

Here, $e_n$ is a 4-element selection vector with all zeros except for the $n^{th}$ element with 1.

In Equation 14, W2 is configured by vertically concatenating two Y vectors, and the lower Y vectors is multiplied by one of 1, −1, j, and −j to compensate for phase rotation between a horizontal beam group and a vertical beam group in an X-pol antenna. In general, 1, −1, j, and −j are referred to as a co-phasor factor. Similarly, in Equation 15, (1, −1) and (j, −j) are considered as a co-phasor factor.

Hereinafter, an index of W1 is defined as i1, and i1 is the same as index n of W1 in the aforementioned equation of 4Tx codebook.

An index of W2 is defined as shown in the following table.

TABLE 4

| Index of W2 | W2 for rank 1 | W2 for rank 2 |
|---|---|---|
| 0 | $\frac{1}{\sqrt{2}}\begin{bmatrix} e_1 \\ q_1^0 e_1 \end{bmatrix}$ | $\frac{1}{2}\begin{bmatrix} e_1 & e_1 \\ e_1 & -e_1 \end{bmatrix}$ |
| 1 | $\frac{1}{\sqrt{2}}\begin{bmatrix} e_1 \\ jq_1^0 e_1 \end{bmatrix}$ | $\frac{1}{2}\begin{bmatrix} e_1 & e_1 \\ je_1 & -je_1 \end{bmatrix}$ |
| 2 | $\frac{1}{\sqrt{2}}\begin{bmatrix} e_1 \\ -q_1^0 e_1 \end{bmatrix}$ | $\frac{1}{2}\begin{bmatrix} e_2 & e_2 \\ e_2 & -e_2 \end{bmatrix}$ |
| 3 | $\frac{1}{\sqrt{2}}\begin{bmatrix} e_1 \\ -jq_1^0 e_1 \end{bmatrix}$ | $\frac{1}{2}\begin{bmatrix} e_2 & e_2 \\ je_2 & -je_2 \end{bmatrix}$ |
| 4 | $\frac{1}{\sqrt{2}}\begin{bmatrix} e_2 \\ q_1^2 e_2 \end{bmatrix}$ | $\frac{1}{2}\begin{bmatrix} e_3 & e_3 \\ e_3 & -e_3 \end{bmatrix}$ |
| 5 | $\frac{1}{\sqrt{2}}\begin{bmatrix} e_2 \\ jq_1^2 e_2 \end{bmatrix}$ | $\frac{1}{2}\begin{bmatrix} e_3 & e_3 \\ je_3 & -je_3 \end{bmatrix}$ |
| 6 | $\frac{1}{\sqrt{2}}\begin{bmatrix} e_2 \\ -q_1^2 e_2 \end{bmatrix}$ | $\frac{1}{2}\begin{bmatrix} e_4 & e_4 \\ e_4 & -e_4 \end{bmatrix}$ |
| 7 | $\frac{1}{\sqrt{2}}\begin{bmatrix} e_2 \\ -jq_1^2 e_2 \end{bmatrix}$ | $\frac{1}{2}\begin{bmatrix} e_4 & e_4 \\ je_4 & -je_4 \end{bmatrix}$ |
| 8 | $\frac{1}{\sqrt{2}}\begin{bmatrix} e_3 \\ q_1^4 e_3 \end{bmatrix}$ | $\frac{1}{2}\begin{bmatrix} e_1 & e_2 \\ e_1 & -e_2 \end{bmatrix}$ |
| 9 | $\frac{1}{\sqrt{2}}\begin{bmatrix} e_3 \\ jq_1^4 e_3 \end{bmatrix}$ | $\frac{1}{2}\begin{bmatrix} e_1 & e_2 \\ je_1 & -je_2 \end{bmatrix}$ |
| 10 | $\frac{1}{\sqrt{2}}\begin{bmatrix} e_3 \\ -q_1^4 e_3 \end{bmatrix}$ | $\frac{1}{2}\begin{bmatrix} e_2 & e_3 \\ e_2 & -e_3 \end{bmatrix}$ |
| 11 | $\frac{1}{\sqrt{2}}\begin{bmatrix} e_3 \\ -jq_1^4 e_3 \end{bmatrix}$ | $\frac{1}{2}\begin{bmatrix} e_2 & e_3 \\ je_2 & -je_3 \end{bmatrix}$ |
| 12 | $\frac{1}{\sqrt{2}}\begin{bmatrix} e_4 \\ q_1^6 e_4 \end{bmatrix}$ | $\frac{1}{2}\begin{bmatrix} e_1 & e_4 \\ e_1 & -e_4 \end{bmatrix}$ |

TABLE 4-continued

| Index of W2 | W2 for rank 1 | W2 for rank 2 |
|---|---|---|
| 13 | $\frac{1}{\sqrt{2}}\begin{bmatrix} e_4 \\ jq_1^6 e_4 \end{bmatrix}$ | $\frac{1}{2}\begin{bmatrix} e_1 & e_4 \\ je_1 & -je_4 \end{bmatrix}$ |
| 14 | $\frac{1}{\sqrt{2}}\begin{bmatrix} e_4 \\ -q_1^6 e_4 \end{bmatrix}$ | $\frac{1}{2}\begin{bmatrix} e_2 & e_4 \\ e_2 & -e_4 \end{bmatrix}$ |
| 15 | $\frac{1}{\sqrt{2}}\begin{bmatrix} e_4 \\ -jq_1^6 e_4 \end{bmatrix}$ | $\frac{1}{2}\begin{bmatrix} e_2 & e_4 \\ je_2 & -je_4 \end{bmatrix}$ |

First Embodiment

A first embodiment of the present invention relates to a codebook subsampling method in submode 1 of PUCCH feedback mode 1-1.

According to the first embodiment of the present invention, a joint encoding method of RI and subsampled W1 in type 5 report may be applied as shown in Table 5 below. A total of 17 hypotheses are present and thus can be represented in 5 bits, and an index of RI and W1 for each hypothesis is shown in Table 5 below. For example, $0^{th}$ hypothesis refers to RI=1 and W1 index 0 and first hypothesis refers to RI=1 and W1 index 1. W1 codebook for ranks 3 and 4 is an identity matrix, and thus separate signaling for W1 is not required. In Table 5 below, the case in which RI is 2 may be represented by a value obtained by subtracting 8 from hypotheses.

TABLE 5

| hypotheses | RI | Index of W1 |
|---|---|---|
| 0–7 | 1 | {0, 1, 2, 3, 4, 5, 6, 7} |
| 8–15 | 2 | {0, 1, 2, 3, 4, 5, 6, 7} |
| 16 | 3 | None (W1 is identity matrix) |
| 17 | 4 | none (W1 is identity matrix) |

Similarly to 8Tx W1 codebook, a codebook of 4Tx W1 codebook proposed in Equation 13 has some overlapped values. For example, comparing $0^{th}$ W1 codeword and $8^{th}$ W1 codeword, Xn of each codeword is configured with the same vector set. For example, Xn of the $0^{th}$ W1 codeword is $$X_0 = \begin{bmatrix} 1 & 1 & 1 & 1 \\ q_1^0 & q_1^8 & q_1^{16} & q_1^{24} \end{bmatrix}$$

and Xn of the $8^{th}$ W1 codeword is $$X_8 = \begin{bmatrix} 1 & 1 & 1 & 1 \\ q_1^8 & q_1^{16} & q_1^{24} & q_1^0 \end{bmatrix},$$

and thus it is seen that Xn of each codeword is configured with the same column vector. This feature is the same as in the case of $i^{th}$ W1 codeword and $(i+8)^{th}$ W1 codeword. Accordingly, when W1 is subsampled in 3 bits, it is effective to remove the overlapped W1. In the subsampling method of Table 5, only codewords from 0 to 7 are subsampled so as not to overlap W1 in consideration of this feature.

It may be possible to perform subsampling using only $8^{th}$ to $15^{th}$ codewords instead of $0^{th}$ to $7^{th}$ in Table 5 using the same principle. Due to the same subsampling principle, only an index is different but codebook performance is not changed.

As another method, a 4-bit payload may be transmitted in type 5 report so as to enhance reception decoding probability. In this case, a joint encoding method of RI and the subsampled W1 may be applied to Table 6 below. A total of 9 hypotheses are present and thus can be represented in 4 bits, and an index of RI and W1 for each hypothesis is shown in Table 6 below. For example, $0^{th}$ hypothesis refers to RI=1 and W1 index 0 and first hypothesis refers to RI=1 and W1 index 2. W1 codebook for ranks 3 and 4 is an identity matrix, and thus separate signaling for W1 is not required.

TABLE 6

| hypotheses | RI | Index of W1 |
|---|---|---|
| 0-3 | 1 | {0, 2, 4, 6} |
| 4-7 | 2 | {0, 2, 4, 6} |
| 8 | 3 | None (W1 is identity matrix) |
| 9 | 4 | none (W1 is identity matrix) |

A subsampling method of Table 6 can be described in terms of two steps. First, like in Table 5, overlapped W1 codewords are removed. Then subsampling is performed so as to distribute values included in a second row of Xn from the remaining {0,1,2,3,4,5,6,7} with an equivalent interval in $(q_1)^k = e^{j2\pi k/32}$, where k=0, 1, 2, . . . 3 1 As such, subsampling is performed so as to distribute the values with an equivalent interval in $(q_1)^k$, thereby preventing beams of W1 from being concentrated on a specific direction on a codebook space. Accordingly, codebook performance degradation caused by subsampling may be reduced.

It may be possible to perform subsampling using only {1,3,5,7} codeword instead of {0,2,4,6} in Table 6 using the same principle. Due to the same subsampling principle, only an index is different but codebook performance is not changed.

In Table 5, W1 indexes in ranks 1 and 2 are the same. Similarly, in Table 6, W1 indexes in ranks 1 and 2 are the same. In addition, the subsampling methods of Tables 5 and 6 may be mixed and configured. For example, W1 of rank 1 may use values of Table 5 and W1 of rank 2 may use values of Table 6. In this case, ranks 1 and 2 have 8 and 4 hypotheses, respectively, and transmission of type 5 report may be possible using 4 bits.

Second Embodiment

A second embodiment of the present invention relates to a codebook subsampling method in submode 2 of PUCCH feedback mode 1-1.

According to the second embodiment of the present invention, a subsampling method of W1/W2 in type 2c report may be applied as shown in Table 7 below. For example, only one of {0,1,2,3,4,5,6,7} may be reported as W1 index in rank 1 and only one of {0,2} may be reported as W2 index. W1 codebook for ranks 3 and 4 is an identity matrix, and thus separate signaling for W1 is not required.

TABLE 7

| | PMI for W1 | | PMI for W2 | | total |
|---|---|---|---|---|---|
| RI | #bits | values | #bits | values | #bits |
| 1 | 3 | {0, 1, 2, 3, 4, 5, 6, 7} | 1 | {0, 2} | 4 |
| 2 | 3 | {0, 1, 2, 3, 4, 5, 6, 7} | 1 | {0, 1} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

In Table 7, W1 is subsampled using the same method as in Table 5 above. The subsampling method of W2 is the same as in the case of 8Tx. W2 is subsampled as shown in Table 7 such that a selection vector of W2 may be fixed to e1 and only a co-phasor factor of W2 may be selected. In this case, even if W1 is configured with {0,1,2,3,4,5,6,7}, the selection vector of W2 is fixed to only e1. Accordingly, a final precoding matrix generated by multiplying W1 and W2 uses only a front $0^{th}$ vector to $7^{th}$ vector among 32 vectors of a 2×32 DFT matrix oversampled 16 times.

When subsampling is performed as shown in Table 7, a precoding matrix is concentrated on a specific direction on a codebook space, thereby causing performance degradation. To overcome the issue, Table 8 below may be applied.

TABLE 8

| | PMI for W1 | | PMI for W2 | | total |
|---|---|---|---|---|---|
| RI | #bits | values | #bits | values | #bits |
| 1 | 3 | {0, 4, 8, 12, 16, 20, 24, 28} | 1 | {0, 2} | 4 |
| 2 | 3 | {0, 4, 8, 12, 16, 20, 24, 28} | 1 | {0, 1} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

As another method, in type 2c report, a subsampling method of W1/W2 may be applied as shown in Table 9 below. In Tables 7 and 8, W1 and W2 are represented in 3 bits and 1 bits, respectively, but in Table 9, W1 and W2 are represented in 2 bits and 2 bits, respectively such that W2 ensures a degree of freedom for selecting a selection vector as well as a co-phasor factor. That is, e3 as well as e1 may be selected as a selection vector. A vector of W1 selected as e1 and a vector of W1 selected as e3 are orthogonal to each other. When frequency selectivity is high, e1 or e3 may be selected in W2 as subband information so as to accurately feedback a channel direction if possible.

TABLE 9

| | PMI for W1 | | PMI for W2 | | total |
|---|---|---|---|---|---|
| RI | #bits | values | #bits | values | #bits |
| 1 | 2 | {0, 2, 4, 6} | 2 | {0, 2, 8, 10} | 4 |
| 2 | 2 | {0, 2, 4, 6} | 2 | {0, 1, 4, 5} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

In Table 9, W1 is subsampled using the same method as in Table 6. W2 is subsampled as shown in Table 9 so as to select e1 and e3 as a selection vector of W2. In this case, even if W1 is configured with {0,2,4,6}, only e1 and e3 instead of e1, e2, e3, and e4 may be selected as the selection vector of W2. Accordingly, a final precoding matrix generated by multiplying W1 and W2 uses only a vector with non-uniformly distributed among 32 vectors of a 2×32 DFT matrix oversampled 16 times. That is, only {0, 2, 4, 6, 16, 18, 20, 22}$^{th}$ DFT vectors are used.

When subsampling is performed as shown in Table 9, a precoding matrix may be concentrated on a specific direction on a codebook space to degrade performance. To overcome this issue, subsampling may be performed as shown in Table 10 below. In Table 19 below, a final precoding matrix generated by multiplying W1 and W2 may use {0,4,8,12,16,20,24,28}$^{th}$ vectors with uniformly distributed values among 32 vectors of a 2×32 DFT matrix oversampled 16 times.

TABLE 10

| RI | PMI for W1 | | PMI for W2 | | total |
|---|---|---|---|---|---|
|  | #bits | values | #bits | values | #bits |
| 1 | 2 | {0, 4, 8, 12} | 2 | {0, 2, 8, 10} | 4 |
| 2 | 2 | {0, 4, 8, 12} | 2 | {0, 1, 4, 5} | 4 |
| 3 | 0 | None (W1 is identity matrix) | 4 | {0, 1, 2, 3, 4, 5, 6, 7, 8, 9, 10, 11, 12, 13, 14, 15} | 4 |
| 4 | 0 | none (W1 is identity matrix) | 4 | {0, 1, 2, 3, 4, 5, 6, 7, 8, 9, 10, 11, 12, 13, 14, 15} | 4 |

In Table 10 above, when rank is 1 and 2, {0, 4, 8, 12} as a codebook index of W1 may be deduced by multiplying a first PMI index $I_{PMI1}$ with one of 0 to 3 by four.

In addition, in Table 10, when rank is 1, {0, 2, 8, 10} as a codebook index of W2 may be deduced by applying a second PMI index $I_{PMI2}$ with one of 0 to 3 to the following equation.

$$2I_{PMI2}+4\cdot \lfloor I_{PMI2}/2 \rfloor \quad \text{[Equation 15]}$$

In addition, in Table 10, when rank is 2, {0, 1, 4, 5} as a codebook index of W2 may be deduced by applying a second PMI index $I_{PMI2}$ with one of 0 to 3 to the following equation.

$$I_{PMI2}+2\cdot \lfloor I_{PMI2}/2 \rfloor \quad \text{[Equation 16]}$$

Third Embodiment

A third embodiment of the present invention relates to another example of the aforementioned 4Tx codebook of Equations 12 to 15, and even if the codebook of the third embodiment of the present invention is used, the first and second embodiments of the present invention may be applied. The aforementioned codebook of Equations 12 to 15 and the codebook according to the third embodiment of the present invention are the same except for some codewords (9, 10, 11, 12, 13, 14, 15) of W2 in rank 2. Accordingly, when the codebook according to the third embodiment of the present invention is subsampled according to the first or second embodiment of the present invention, subsampled codebooks are the same.

4 Tx codebook according to the third embodiment of the present invention may be represented by multiplication of two matrices as follows.

$$W=W_1\cdot W_2 \quad \text{[Equation 17]}$$

Here, the inner precoder $W_1$ and the outer precoder $W_2$ may represent wideband/long-term channel properties and subband/short-term channel properties, respectively. $W_1$ may be set as follows.

$$W_1 = \begin{bmatrix} X_n & 0 \\ 0 & X_n \end{bmatrix}, n=0, 1, \ldots, 15 \quad \text{[Equation 18]}$$

Here, $X_n$ may be set as follows.

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32} \quad \text{[Equation 53]}$$

Codebook $W_2$ for rank 1 may be set as follows.

$$W_{2,n} \in \left\{ \frac{1}{\sqrt{2}}\begin{bmatrix} Y \\ \alpha(i)Y \end{bmatrix}, \frac{1}{\sqrt{2}}\begin{bmatrix} Y \\ j\alpha(i)Y \end{bmatrix}, \right. \quad \text{[Equation 19]}$$

$$\left. \frac{1}{\sqrt{2}}\begin{bmatrix} Y \\ -\alpha(i)Y \end{bmatrix}, \frac{1}{\sqrt{2}}\begin{bmatrix} Y \\ -j\alpha(i)Y \end{bmatrix} \right\},$$

$$Y=e_i \in \{e_1, e_2, e_3, e_4\} \text{ and } \alpha(i)=q_1^{2(i-1)}$$

Codebook $W_2$ for rank 2 may be set as follows.

$$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \right. \quad \text{[Equation 20]}$$

$$\left. \frac{1}{2}\begin{bmatrix} Y_1 & Y_2 \\ -Y_1 & -Y_2 \end{bmatrix} \right\} (Y_1, Y_2) \in \{(e_2, e_4)\} \text{ and}$$

$$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}(Y_1, Y_2) \in$$

$$\{(e_1, e_1), (e_2, e_2), (e_3, e_3), (e_4, e_4)\} \text{ and}$$

$$W_{2,n} \in \left\{ \frac{1}{2}\begin{bmatrix} Y_1 & Y_2 \\ Y_2 & -Y_1 \end{bmatrix} \right\}(Y_1, Y_2) \in$$

$$\{(e_1, e_3), (e_2, e_4), (e_3, e_1), (e_4, e_2)\}$$

Here, $e_n$ is a 4-element selection vector with all zeros except for the $n^{th}$ element with 1.

An index of W1 is defined as i1, and i1 is the same as index n of W1 in the aforementioned equation of 4Tx codebook.

In addition, an index of W2 is defined as shown in the following table.

TABLE 4

| Index of W2 | W2 for rank 1 | W2 for rank 2 |
|---|---|---|
| 0 | $\frac{1}{\sqrt{2}}\begin{bmatrix} e_1 \\ q_1^0 e_1 \end{bmatrix}$ | $\frac{1}{2}\begin{bmatrix} e_1 & e_1 \\ e_1 & -e_1 \end{bmatrix}$ |
| 1 | $\frac{1}{\sqrt{2}}\begin{bmatrix} e_1 \\ jq_1^0 e_1 \end{bmatrix}$ | $\frac{1}{2}\begin{bmatrix} e_1 & e_1 \\ je_1 & -je_1 \end{bmatrix}$ |
| 2 | $\frac{1}{\sqrt{2}}\begin{bmatrix} e_1 \\ -q_1^0 e_1 \end{bmatrix}$ | $\frac{1}{2}\begin{bmatrix} e_2 & e_2 \\ e_2 & -e_2 \end{bmatrix}$ |

TABLE 4-continued

| Index of W2 | W2 for rank 1 | W2 for rank 2 |
|---|---|---|
| 3 | $\frac{1}{\sqrt{2}}\begin{bmatrix} e_1 \\ -jq_1^0 e_1 \end{bmatrix}$ | $\frac{1}{2}\begin{bmatrix} e_2 & e_2 \\ je_2 & -je_2 \end{bmatrix}$ |
| 4 | $\frac{1}{\sqrt{2}}\begin{bmatrix} e_2 \\ q_1^2 e_2 \end{bmatrix}$ | $\frac{1}{2}\begin{bmatrix} e_3 & e_3 \\ e_3 & -e_3 \end{bmatrix}$ |
| 5 | $\frac{1}{\sqrt{2}}\begin{bmatrix} e_2 \\ jq_1^2 e_2 \end{bmatrix}$ | $\frac{1}{2}\begin{bmatrix} e_3 & e_3 \\ je_3 & -je_3 \end{bmatrix}$ |
| 6 | $\frac{1}{\sqrt{2}}\begin{bmatrix} e_2 \\ -q_1^2 e_2 \end{bmatrix}$ | $\frac{1}{2}\begin{bmatrix} e_4 & e_4 \\ e_4 & -e_4 \end{bmatrix}$ |
| 7 | $\frac{1}{\sqrt{2}}\begin{bmatrix} e_2 \\ -jq_1^2 e_2 \end{bmatrix}$ | $\frac{1}{2}\begin{bmatrix} e_4 & e_4 \\ je_4 & -je_4 \end{bmatrix}$ |
| 8 | $\frac{1}{\sqrt{2}}\begin{bmatrix} e_3 \\ q_1^4 e_3 \end{bmatrix}$ | $\frac{1}{2}\begin{bmatrix} e_2 & e_4 \\ e_2 & e_4 \end{bmatrix}$ |
| 9 | $\frac{1}{\sqrt{2}}\begin{bmatrix} e_3 \\ jq_1^4 e_3 \end{bmatrix}$ | $\frac{1}{2}\begin{bmatrix} e_2 & e_4 \\ e_2 & -e_4 \end{bmatrix}$ |
| 10 | $\frac{1}{\sqrt{2}}\begin{bmatrix} e_3 \\ -q_1^4 e_3 \end{bmatrix}$ | $\frac{1}{2}\begin{bmatrix} e_2 & e_4 \\ -e_2 & e_4 \end{bmatrix}$ |
| 11 | $\frac{1}{\sqrt{2}}\begin{bmatrix} e_3 \\ -jq_1^4 e_3 \end{bmatrix}$ | $\frac{1}{2}\begin{bmatrix} e_2 & e_4 \\ -e_2 & -e_4 \end{bmatrix}$ |
| 12 | $\frac{1}{\sqrt{2}}\begin{bmatrix} e_4 \\ q_1^6 e_4 \end{bmatrix}$ | $\frac{1}{2}\begin{bmatrix} e_1 & e_3 \\ e_3 & -e_1 \end{bmatrix}$ |
| 13 | $\frac{1}{\sqrt{2}}\begin{bmatrix} e_4 \\ jq_1^6 e_4 \end{bmatrix}$ | $\frac{1}{2}\begin{bmatrix} e_2 & e_4 \\ e_4 & -e_2 \end{bmatrix}$ |
| 14 | $\frac{1}{\sqrt{2}}\begin{bmatrix} e_4 \\ -q_1^6 e_4 \end{bmatrix}$ | $\frac{1}{2}\begin{bmatrix} e_3 & e_1 \\ e_1 & -e_3 \end{bmatrix}$ |
| 15 | $\frac{1}{\sqrt{2}}\begin{bmatrix} e_4 \\ -jq_1^6 e_4 \end{bmatrix}$ | $\frac{1}{2}\begin{bmatrix} e_4 & e_2 \\ e_2 & -e_4 \end{bmatrix}$ |

Figure 16:
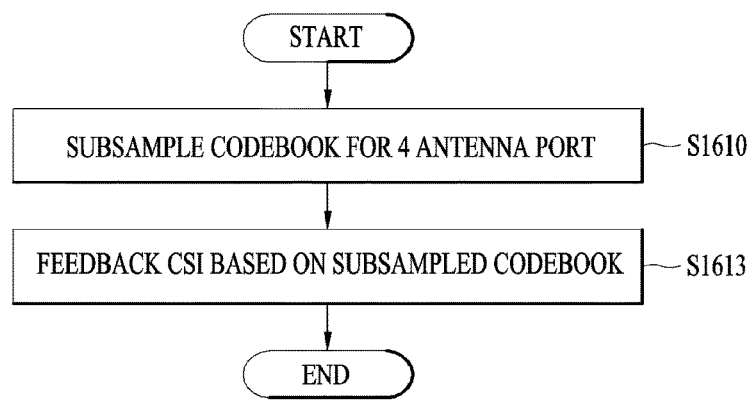
FIG. 16 is a flowchart of a channel state information reporting method according to an embodiment of the present invention.

With reference to FIG. 16, a channel state information reporting method will be described according to an embodiment of the present invention.

In operation S161, a UE reports RI and a first PMI together and joint-encodes the RI and the first PMI to one encoding value in a report mode for a 4 antenna port.

A detailed joint encoding method is the same as the joint encoding method described in the first embodiment of the present invention, and thus a detailed description thereof will be omitted.

In operation S163, channel state information including an encoding value is reported.

Here, when RI is 1, a codebook index has the same value as the encoding value, and when RI is 2, the codebook index has a value that is smaller than the encoding index by 8. In detail, when RI is 1, the encoding value may have one of integers from 0 to 7, when RI is 2, the encoding value may have one of integers from 8 to 15, when RI is 3, the encoding value may have 16, and when RI is 4, the encoding value may have 17.

With regard to the channel state information transmitting method, the aforementioned various embodiments of the present invention are independently applied or two or more embodiments are simultaneously applied and descriptions of redundant parts are omitted for clarity.

In addition, the same idea as that proposed by the present invention can also be applied to uplink MIMO transmission and reception for MIMO transmission between a BS and a relay (in backhaul uplink and backhaul downlink) and MIMO transmission between a relay and a UE (in access uplink and access downlink).

BS and UE to which Embodiments of the Present Invention are Applicable

Figure 17:
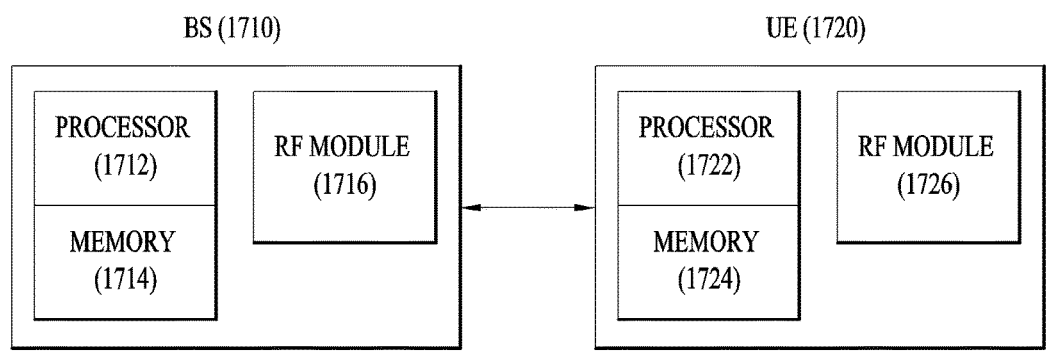
FIG. 17 is a diagram illustrating a BS and a UE to which an embodiment of the present invention is applicable.

FIG. 17 is a diagram illustrating a BS 110 and a UE 120 to which an embodiment of the present invention is applicable.

When a relay is included in a wireless communication system, communication in backhaul link is performed between the BS and the relay, and communication in access link is performed between the relay and the UE. Accordingly, the BS or the UE illustrated in the drawing may be replaced by a relay as necessary.

Referring to FIG. 17, the wireless communication system includes a BS 1710 and a UE 1720. The BS 1710 includes a processor 1712, a memory 1714, and a radio frequency (RF) unit 1716. The processor 1712 may be configured to embody procedures and/or methods proposed by the present invention. The memory 1714 is connected to the processor 1712 and stores various information related to an operation of the processor 1712. The RF unit 1716 is connected to the processor 1712 and transmits and/or receives a radio signal. The UE 1720 includes a processor 1722, a memory 1724, and an RF unit 1726. The processor 1722 may be configured to embody procedures and/or methods proposed by the present invention. The memory 1724 is connected to the processor 1722 and stores various information related to an operation of the processor 1722. The RF unit 1726 is connected to the processor 1722 and transmits and/or receives a radio signal. The BS 1710 and/or the UE 1720 may have a single antenna or a multiple antenna. The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments according to the present invention can be implemented by various means, for example, hardware, firmware, software, or combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor.

The memory unit may be located inside or outside the processor to transmit and receive data to and from the processor through various means which are well known.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The above-described embodiments of the present invention can be applied to a wireless communication system such as a user equipment (UE), a relay, a base station (BS), etc.

What is claimed is:

1. A method for reporting channel state information (CSI) by a user equipment (UE) in a wireless communication system, the method comprising:
    jointly encoding a rank indicator (RI) and a first precoding matrix indicator (PMI) into an encoded value for a specific CSI report mode; and
    reporting the encoded value,
    wherein the RI and the first PMI are jointly encoded into the encoded value in a way that following conditions are satisfied:
        when the RI is 1 and a codebook index for the first PMI is same as the encoded value, the encoded value is an integer ranging from 0 to 7,
        when the RI is 2 and the codebook index for the first PMI is the encoded value minus 8, the encoded value is an integer ranging from 8 to 15,
        when the RI is 3 and a first precoding matrix corresponding to the first PMI is an identity matrix, the encoded value is 16, and
        when the RI is 4 and the first precoding matrix corresponding to the first PMI is the identity matrix, the encoded value is 17.

2. The method according to claim 1, wherein when the encoded value is an integer ranging from 0 to 15, the codebook index for the first PMI is only among 8 codebook indices out of 16 codebook indices associated with the first PMI.

3. The method according to claim 2, wherein the 8 codebook indices correspond to an integer ranging from 0 to 7.

4. The method according to claim 1, further comprising:
    reporting a second PMI and a wideband channel quality indicator (CQI) in a same subframe.

5. The method according to claim 1, wherein a final precoding matrix is to be determined based on the first PMI and a second PMI.

6. A user equipment (UE) for reporting channel state information (CSI) in a wireless communication system, the UE comprising:
    a radio frequency (RF) unit; and
    a processor operably coupled with the RF unit and configured to:
        jointly encode a rank indicator (RI) and a first precoding matrix indicator (PMI) into an encoded value for a specific CSI report mode, and report the encoded value,
        wherein the RI and the first PMI are jointly encoded into the encoded value in a way that following conditions are satisfied:
            when the RI is 1 and a codebook index for the first PMI is same as the encoded value, the encoded value is an integer ranging from 0 to 7,
            when the RI is 2 and the codebook index is the encoded value minus 8, the encoded value is an integer ranging from 8 to 15,
            when the RI is 3 and a first precoding matrix corresponding to the first PMI is an identity matrix, the encoded value is 16, and
            when the RI is 4 and the first precoding matrix corresponding to the first PMI is the identity matrix, the encoded value is 17.

7. The UE according to claim 6, wherein when the encoded value is an integer ranging from 0 to 15, the codebook index for the first PMI is only among 8 codebook indices out of 16 codebook indices associated with the first PMI.

8. The UE according to claim 7, wherein the 8 codebook indices correspond to an integer ranging from 0 to 7.

9. The UE according to claim 6, wherein the processor is further configured to report a second PMI and a wideband channel quality indicator (CQI) in a same subframe.

10. The UE according to claim 6, wherein a final precoding matrix is to be determined based on the first PMI and a second PMI.

* * * * *